(12) United States Patent
Kyoya

(10) Patent No.: US 7,839,582 B2
(45) Date of Patent: Nov. 23, 2010

(54) OPTICAL ELEMENT

(75) Inventor: Shoichi Kyoya, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 209 days.

(21) Appl. No.: 12/134,644

(22) Filed: Jun. 6, 2008

(65) Prior Publication Data
US 2009/0027777 A1    Jan. 29, 2009

(30) Foreign Application Priority Data
Jul. 25, 2007    (JP) .............................. 2007-193362

(51) Int. Cl.
    *G02B 9/00*    (2006.01)
(52) U.S. Cl. ...................................... 359/796; 359/797
(58) Field of Classification Search ................. 359/796, 359/797, 793, 794, 795, 785, 786
    See application file for complete search history.

(56) References Cited

U.S. PATENT DOCUMENTS

| 6,061,169 A | 5/2000 | Feldman et al. | |
| 6,424,467 B1 * | 7/2002 | Goggins | 359/626 |
| 6,682,478 B2 * | 1/2004 | Nakamura | 600/111 |
| 6,747,805 B2 * | 6/2004 | Sayag | 359/664 |
| 6,937,816 B2 * | 8/2005 | Endo et al. | 396/79 |

FOREIGN PATENT DOCUMENTS

JP    2002-355826    12/2002

* cited by examiner

*Primary Examiner*—Timothy J Thompson
(74) *Attorney, Agent, or Firm*—Brinks Hofer Gilson & Lione

(57) ABSTRACT

An optical element includes a transparent substrate, a first light-blocking film attached to at least one surface of the transparent substrate and having a first circular opening, and a first lens portion disposed on the at least one surface of the transparent substrate, the first lens portion being composed of ultraviolet curable resin and having a first lens-functioning surface. The first lens portion is disposed such that the first lens-functioning surface covers the first opening and overlaps an area of the first light-blocking film that surrounds the first opening.

8 Claims, 4 Drawing Sheets

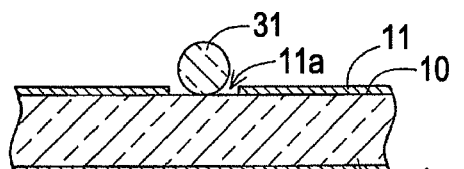
FIG. 3A
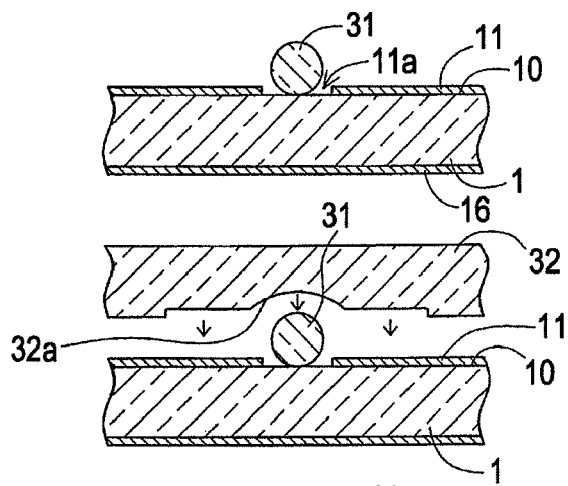
FIG. 3B
FIG. 3C
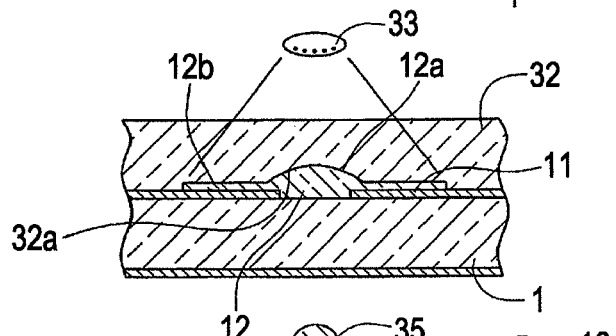
FIG. 3D
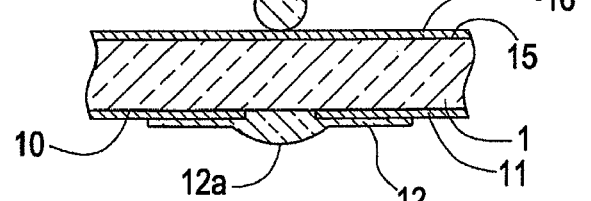
FIG. 3E
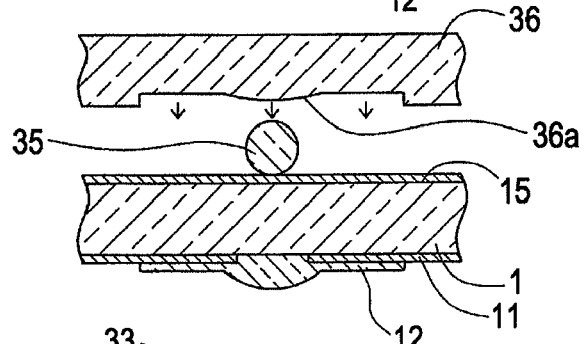
FIG. 3F
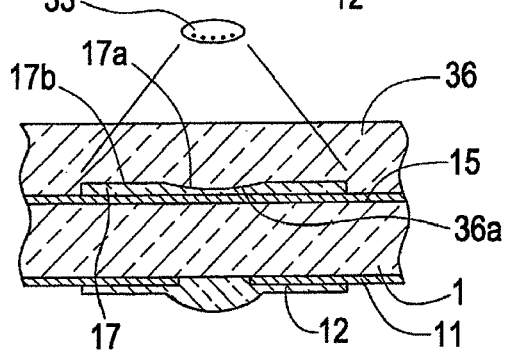

OPTICAL ELEMENT

CLAIM OF PRIORITY

This application claims benefit of the Japanese Patent Application No. 2007-193362 filed on Jul. 25, 2007, the entire content of which is hereby incorporated by reference.

BACKGROUND OF THE INVENTION

1. Field of the Invention

The present invention relates to an optical element having a transparent substrate composed of, for example, glass and a lens portion formed on a surface of the transparent substrate, and particularly, to an optical element additionally having a light-blocking film formed on the surface of such a transparent substrate.

2. Description of the Related Art

As an example of an optical element having a lens portion used in cameras or the like, an optical element that includes a transparent substrate composed of, for example, glass or resin and a lens portion formed on a surface of the transparent substrate is known. The lens portion generally has a lens-functioning surface and thus has a light focusing function. It is also known that an ultraviolet curable resin is a suitable material for forming multiple lens portions of this type efficiently in an array on a transparent substrate.

In such a case, the lens portions are formed in the following manner. First, uncured ultraviolet curable resin is placed on the transparent substrate. Then, a die is placed over the ultraviolet curable resin from above the transparent substrate, and is pressed so that the ultraviolet curable resin is spread within the space between the transparent substrate and the die. Subsequently, ultraviolet light is emitted towards the ultraviolet curable resin through the transparent substrate, causing the ultraviolet curable resin to become cured. As a result, lens portions are formed. An example of such a method for forming lens portions is disclosed in Japanese Unexamined Patent Application Publication No. 2002-355826.

An optical element having a transparent substrate and a lens portion formed thereon is also generally equipped with a light-blocking film on the transparent substrate, which serves as an aperture stop for the lens portion. Such a light-blocking film has a circular opening having a predetermined diameter and is attached to a surface of the transparent substrate. The lens portion is disposed on the light-blocking film such that the lens-functioning surface of the lens portion covers the opening. This allows the opening of the light-blocking film to function as an aperture stop for the lens portion.

However, with the outer edge of the lens portion being located close to the opening of the light-blocking film, the light coming in through the outer edge or light reflected at the outer edge can unfavorably pass through the opening of the light-blocking film functioning as an aperture stop. This can sometimes produce lens flare or ghost on the image obtained by the optical element.

SUMMARY OF THE INVENTION

An optical element includes a transparent substrate; a light-blocking film attached to at least one surface of the transparent substrate and having a circular opening; and a lens portion disposed on the at least one surface of the transparent substrate. The lens portion is composed of ultraviolet curable resin and has a lens-functioning surface. The lens portion is disposed such that the lens-functioning surface covers the opening and overlaps an area of the light-blocking film that surrounds the opening. According to this configuration, the outer edge of the lens portion is located distant from the opening, thus preventing the light coming in through the outer edge or light reflected at the outer edge from passing through the opening that functions as an aperture stop.

BRIEF DESCRIPTION OF THE DRAWINGS

FIGS. 3A to 3F are cross-sectional views showing steps for forming lens portions on the first transparent substrate having the first light-blocking film and the filter film formed thereon.

DESCRIPTION OF THE PREFERRED EMBODIMENTS

Figure 1:
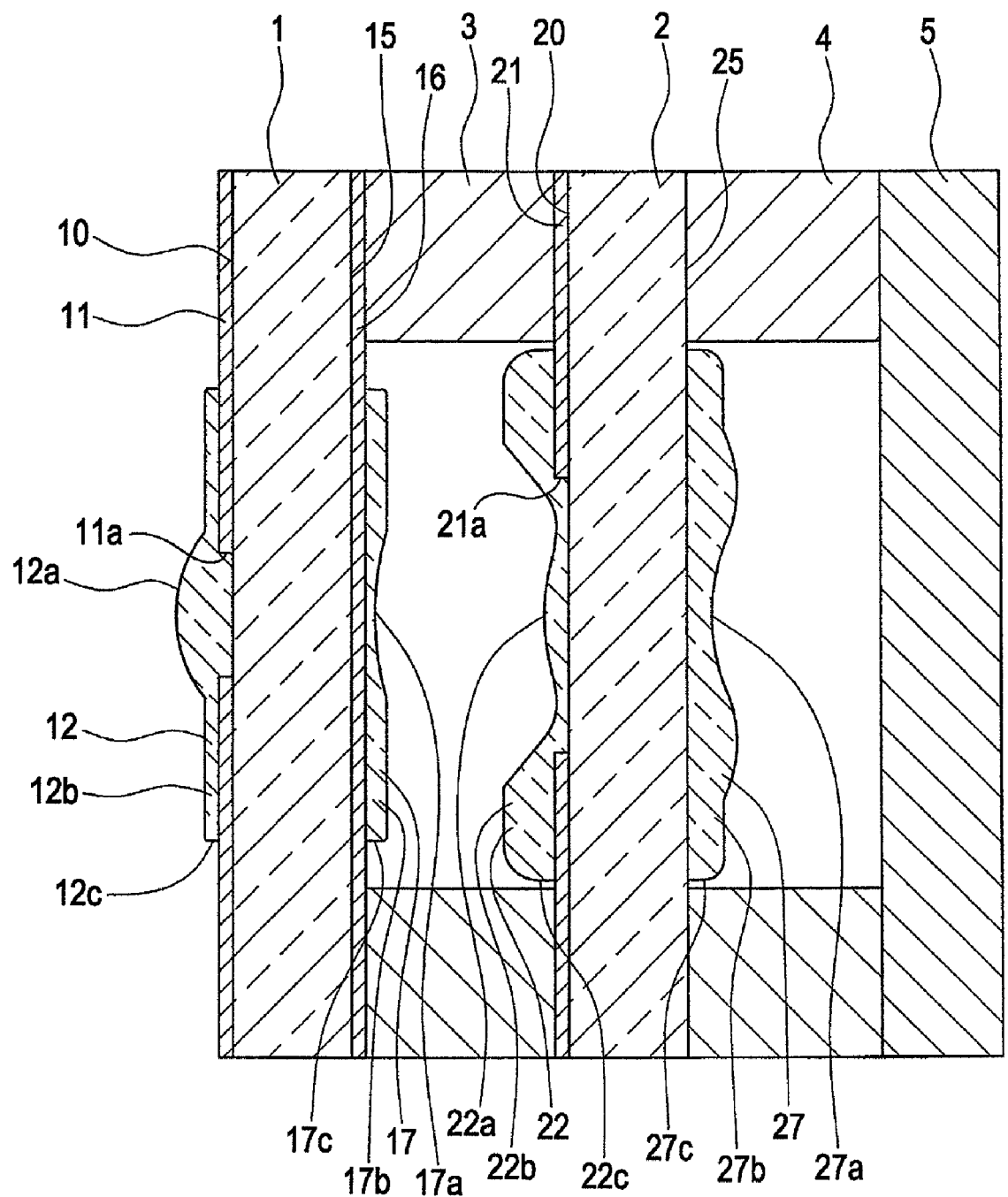
FIG. 1 is a cross-sectional view of an optical element according to an embodiment.

An embodiment of the present invention will now be described with reference to the drawings. FIG. 1 is a cross-sectional view of an optical element according to this embodiment. As shown in FIG. 1, the optical element according to this embodiment includes a first transparent substrate 1 formed of transparent glass and having lens portions on surfaces thereof, a second transparent substrate 2 formed of transparent glass and having lens portions on surfaces thereof, a first spacer 3, a second spacer 4, and a light-receiving portion 5. The first transparent substrate 1 and the second transparent substrate 2 are disposed facing each other with the first spacer 3 therebetween, and the second transparent substrate 2 and the light-receiving portion 5 are disposed facing each other with the second spacer 4 therebetween. Consequently, when the first transparent substrate 1 receives light, the lens portions provided on the first transparent substrate 1 and the second transparent substrate 2 focus the light on the light-receiving portion 5.

The first transparent substrate 1 has a first surface 10 coated with a first light-blocking film 11. The first light-blocking film 11 is a thin film that does not transmit light, and has a first circular opening 11a having a predetermined diameter. The first surface 10 also has formed thereon a first lens portion 12 composed of ultraviolet curable resin, which covers the first opening 11a and an area of the first light-blocking film 11 that surrounds the first opening 11a.

The first lens portion 12 has a first lens-functioning surface 12a in the central region thereof. This region of the first lens portion 12 provided with the first lens-functioning surface 12a covers the first opening 11a. The first lens-functioning surface 12a functions as an aspherical convex lens. A region of the first lens portion 12 that surrounds the first lens-functioning surface 12a defines a peripheral section 12b having a thickness smaller than that of the first lens-functioning surface 12a. The first lens portion 12 is disposed on the first light-blocking film 11 in a manner such that an area of the first lens portion 12 that extends from an outer edge 12c of the peripheral section 12b to a position slightly inward of the outer periphery of the first lens-functioning surface 12a overlaps the first light-blocking film 11.

In this manner, the first light-blocking film 11 having the first opening 11a that is covered with the first lens-functioning surface 12a of the first lens portion 12 is disposed on the first surface 10. Thus, the first opening 11a functions as an aperture stop for the first lens-functioning surface 12a. In addition, the peripheral section 12b of the first lens portion 12 is disposed so as to overlap the first light-blocking film 11, as described above. This implies that the outer edge 12c of the peripheral section 12b is located distant from the first opening 11a, thus preventing the light coming in through the outer edge 12c or light reflected at the outer edge 12c from entering the first opening 11a. In order to prevent lens flare and ghost from occurring, the first lens portion 12 may be given an outside diameter that is greater than or equal to about 1.95 times the diameter of the first opening 11a.

A second surface 15 of the first transparent substrate 1 that is opposite to the first surface 10 is coated with a filter film 16. The filter film 16 is constituted by multiple infrared blocking layers and is disposed entirely over the second surface 15. This filter film 16 has formed thereon a second lens portion 17 composed of ultraviolet curable resin.

The second lens portion 17 has a second lens-functioning surface 17a in the central region thereof. The second lens-functioning surface 17a functions as an aspherical concave lens. A region of the second lens portion 17 that surrounds the second lens-functioning surface 17a defines a peripheral section 17b. The second lens portion 17 is disposed in a manner such that an area of the second lens portion 17 that extends from an outer edge 17c of the peripheral section 17b to a position slightly inward of the outer periphery of the second lens-functioning surface 17a overlaps the first light-blocking film 11. Similar to the first lens portion 12, in order to prevent lens flare and ghost from occurring, the second lens portion 17 needs to have an outside diameter that is greater than or equal to about 1.95 times the diameter of the first opening 11a.

The second transparent substrate 2 has a third surface 20 that faces the second surface 15 of the first transparent substrate 1. The third surface 20 is coated with a second light-blocking film 21. The second light-blocking film 21 has a second circular opening 21a having a predetermined diameter. The third surface 20 has formed thereon a third lens portion 22 composed of ultraviolet curable resin, which covers the second opening 21a and an area of the second light-blocking film 21 that surrounds the second opening 21a.

The third lens portion 22 has a third lens-functioning surface 22a in the central region thereof. The third lens portion 22 is disposed such that an area of the third lens portion 22 that extends from an outer edge 22c of a peripheral section 22b to a position slightly inward of the outer periphery of the third lens-functioning surface 22a overlaps the second light-blocking film 21. The third lens-functioning surface 22a functions as an aspherical lens having a convex central area and a concave peripheral area. The peripheral section 22b is defined by a region of the third lens portion 22 that surrounds the third lens-functioning surface 22a. The third lens portion 22 is disposed such that this peripheral section 22b covers and overlaps the second light-blocking film 21. In order to prevent the third lens portion 22 from inducing lens flare or ghost, the third lens portion 22 needs to have an outside diameter that is greater than or equal to about 1.3 times the diameter of the second opening 21a.

A fourth surface 25 of the second transparent substrate 2 that is opposite to the third surface 20 has formed thereon a fourth lens portion 27 composed of ultraviolet curable resin. The fourth lens portion 27 has a fourth lens-functioning surface 27a in the central region thereof. The fourth lens-functioning surface 27a functions as an aspherical lens having a concave central area and a convex peripheral area. A region of the fourth lens portion 27 that surrounds the fourth lens-functioning surface 27a defines a peripheral section 27b. The fourth lens portion 27 is disposed in a manner such that an area of the fourth lens portion 27 that extends from an outer edge 27c of the peripheral section 27b to a position slightly inward of the outer periphery of the fourth lens-functioning surface 27a overlaps the second light-blocking film 21. In order to prevent the fourth lens portion 27 from inducing lens flare and ghost, the fourth lens portion 27 needs to have an outside diameter that is greater than or equal to about 1.45 times the diameter of the second opening 21a.

Accordingly, in the optical element according to this embodiment, the first transparent substrate 1 and the second transparent substrate 2 each have lens portions on the opposite surfaces thereof, which means that the optical element has a total of four lens portions. Of these lens portions, the first lens portion 12 may be composed of a low dispersion material and the second lens portion 17 may be composed of a high dispersion material. With this configuration, chromatic aberration can be corrected. As an alternative configuration, the third lens portion 22 may be composed of a high dispersion material and the fourth lens portion 27 may be composed of a low dispersion material. As a further alternative, another configuration may be applied in which the first lens portion 12 and the fourth lens portion 27 are both composed of a low dispersion material and the second lens portion 17 and the third lens portion 22 are both composed of a high dispersion material. This configuration can similarly allow for correction of chromatic aberration.

Figure 2A:
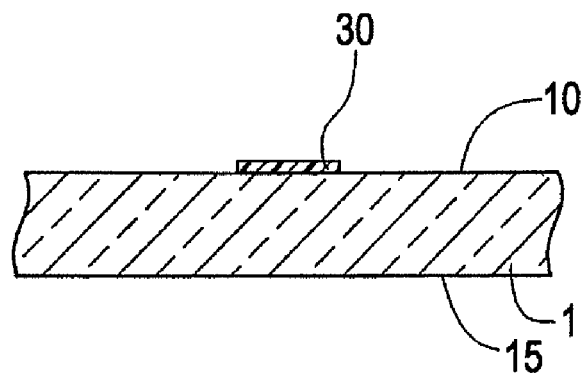
FIGS. 2A to 2D are cross-sectional views showing steps for forming a first light-blocking film and a filter film on a first transparent substrate.

A process for manufacturing the optical element according to this embodiment will now be described. FIGS. 2A to 2D are cross-sectional views showing steps for forming the first light-blocking film 11 and the filter film 16 on the first transparent substrate 1. Referring to FIG. 2A, a resist layer 30 is applied onto an area of the first surface 10 of the first transparent substrate 1 where a first opening 11a is to be formed. The resist layer 30 is applied in such a manner that the resist layer 30 is given the shape of a circle with the same diameter as the first opening 11a.

Figure 2B:
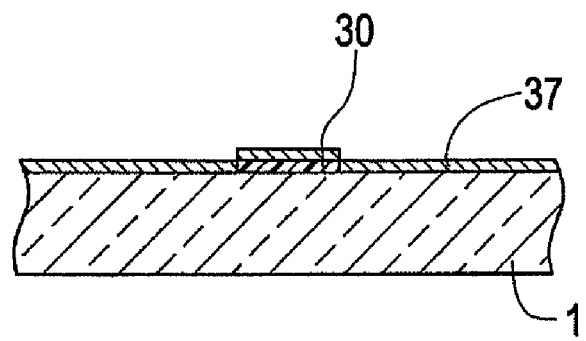
Figure 2C:
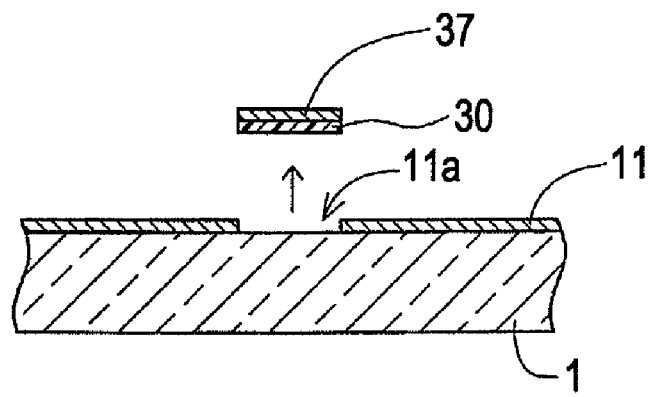
Figure 2D:
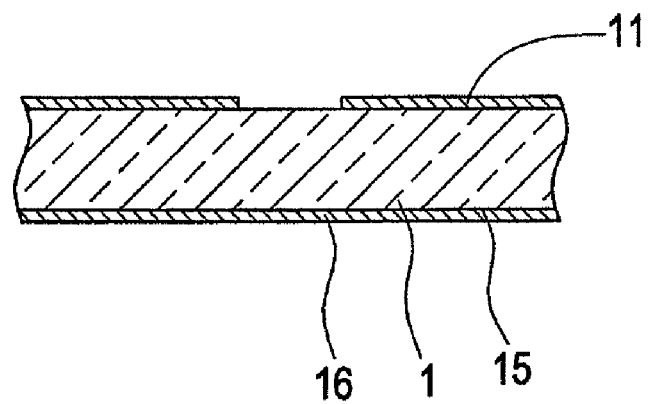

Subsequently, referring to FIG. 2B, a material for forming a first light-blocking film 11 is deposited over the first surface 10 of the first transparent substrate 1 by sputtering, thereby forming a light-blocking-film pre-layer 37. Next, referring to FIG. 2C, the resist layer 30 and an area of the light-blocking-film pre-layer 37 that corresponds thereto are removed, whereby a first light-blocking film 11 having a first opening 11a is formed. Then, referring to FIG. 2D, a filter film 16 is formed over the second surface 15 of the first transparent substrate 1 by vapor deposition.

As a result of these above-described steps, a first light-blocking film 11 and a filter film 16 are formed on the first transparent substrate 1. FIGS. 3A to 3F are cross-sectional views showing steps for forming lens portions 12 and 17 on the first transparent substrate 1 having formed thereon the first light-blocking film 11 and the filter film 16. First, referring to FIG. 3A, an unshaped resin material 31 composed of ultraviolet curable resin is placed in the first opening 11a of the first transparent substrate 1.

Subsequently, referring to FIG. 3B, a transparent die 32 with a lens shaping surface 32a having the shape of a lens portion 12 to be formed is moved towards the first surface 10 of the first transparent substrate 1. The transparent die 32 is composed of glass or resin material and is thus capable of transmitting ultraviolet light. As the transparent die 32 moves closer towards the first surface 10, the transparent die 32 presses against the resin material 31 and thus transfers the shape of the lens shaping surface 32a to the surface of the resin material 31. As a result, a first lens portion 12 having a first lens-functioning surface 12a and a peripheral section 12b is formed.

Referring to FIG. 3C, after pressing the transparent die 32 against the resin material 31, ultraviolet light is emitted from an ultraviolet light source 33, disposed at the first surface 10 side, towards the resin material 31 through the transparent die 32. Since the transparent die 32 is capable of transmitting ultraviolet light as mentioned above, the ultraviolet light emitted can reach the resin material 31 by passing through the transparent die 32 even in the state where the resin material 31 is being pressed by the transparent die 32. As described previously, the first light-blocking film 11 is formed on the first surface 10 of the first transparent substrate 1, and the first lens portion 12 is then formed on the first light-blocking film 11 such that the peripheral section 12b overlaps the first light-blocking film 11. For this reason, if ultraviolet light is supposedly emitted from the second surface 15 side, the ultraviolet light will not be able to reach this overlapping area of the peripheral section 12b. In the present invention, since the die used for pressing and shaping the resin material 31 is a transparent die, the ultraviolet light can be emitted from the side with the die. Consequently, even if the first light-blocking film 11 and the first lens portion 12 have an overlapping area, the resin material 31 can be entirely irradiated with ultraviolet light. With the ultraviolet light, the resin material 31 is cured so as to become the first lens portion 12.

Subsequently, referring to FIG. 3D, the first transparent substrate 1 is flipped over, and an unshaped resin material 35 composed of ultraviolet curable resin is placed on the second surface 15. Then, referring to FIG. 3E, a transparent die 36 with a lens shaping surface 36a having the shape of a lens portion 17 to be formed is moved towards the second surface 15. Like the transparent die 32, the transparent die 36 is also capable of transmitting ultraviolet light. The transparent die 36 presses against the resin material 35 and thus transfers the shape of the lens shaping surface 36a to the surface of the resin material 35. As a result, a second lens portion 17 having a second lens-functioning surface 17a and a peripheral section 17b is formed.

Referring to FIG. 3F, after pressing the transparent die 36 against the resin material 35, ultraviolet light is emitted from the ultraviolet light source 33, now disposed at the second surface 15 side, towards the resin material 35 through the transparent die 36. With the ultraviolet light, the resin material 35 is cured so as to become the second lens portion 17.

Although a detailed description will be omitted here, the second transparent substrate 2 undergoes the same steps as described above so that a second light-blocking film 21, a third lens portion 22, and a fourth lens portion 27 are formed on the second transparent substrate 2. Then, a first spacer 3 is attached between the first transparent substrate 1 and the second transparent substrate 2, and a second spacer 4 is attached to the fourth surface 25 of the second transparent substrate 2. Finally, a light-receiving portion 5 is attached to the second spacer 4 such that the light-receiving portion 5 faces the second transparent substrate 2.

Figure 4:
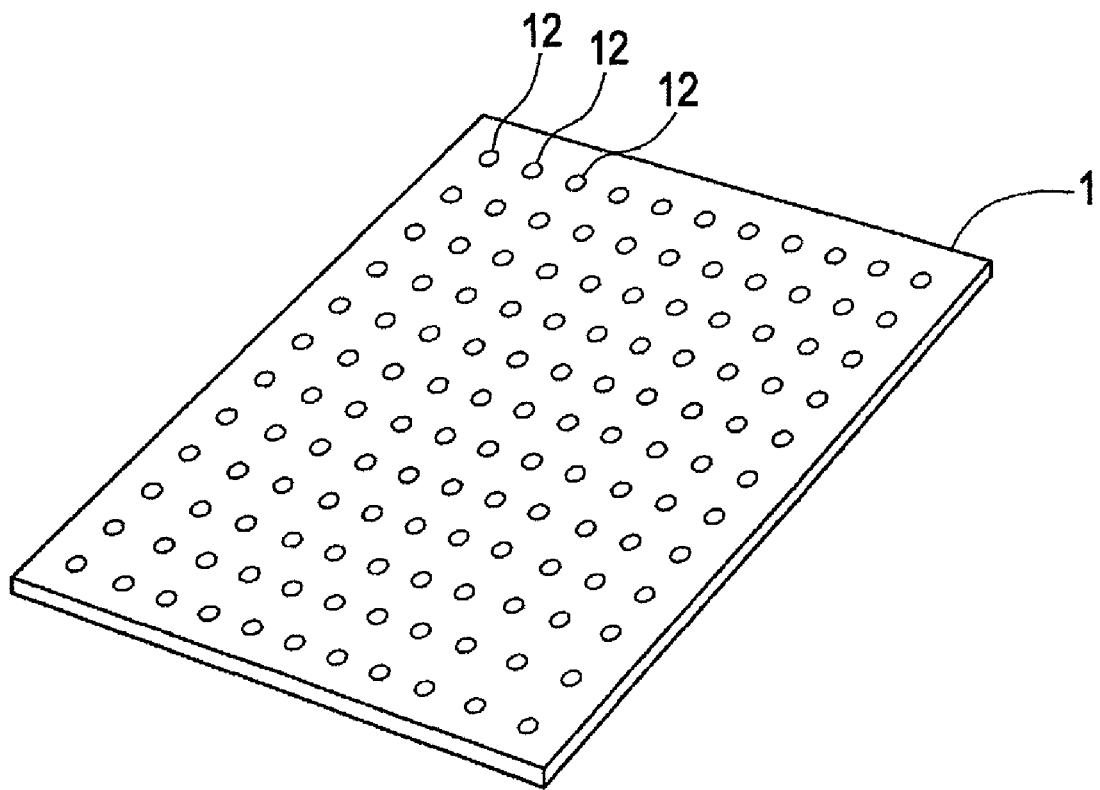
FIG. 4 is a perspective view showing a state where a plurality of lens portions are formed in an array on a transparent substrate.

Each of the above-described lens portions on the first transparent substrate 1 and the second transparent substrate 2 is formed in a plurality in a simultaneous fashion so as to be arranged in an array as shown in FIG. 4. FIG. 4 is a perspective view showing a state where a plurality of first lens portions 12 are formed in an array on the first transparent substrate 1. As described above, the lens portions are first formed on the first transparent substrate 1 and the second transparent substrate 2, and the first transparent substrate 1, the second transparent substrate 2, and the light-receiving portion 5 are then combined by attaching them to one another with the spacers therebetween. Subsequently, the combined product is cut into pieces, thereby forming individual optical elements.

Although an embodiment of the present invention has been described above, the present invention is not limited to the above embodiment, and various modifications are permissible within the technical scope of the invention. For example, although the first transparent substrate 1 and the second transparent substrate 2 each have lens portions on opposite surfaces thereof so as to have a total of four lens-functioning surfaces in the above embodiment, other configurations are permissible as long as each of the transparent substrates 1 and 2 has at least one light-blocking film and at least one lens portion and the lens portion is disposed so as to overlap the opening of the light-blocking film.

Furthermore, although the lens-functioning surfaces functioning as lenses in the above embodiment have a convex shape, a concave shape, or a combination of the two shapes, the lens-functioning surfaces may alternatively have other shapes, such as the shape of a diffractive lens. Furthermore, although the transparent substrates in the above embodiment are composed of glass, a resin material may be used as an alternative as long as the material is transparent.

What is claimed is:

1. An optical element comprising:
   a transparent substrate;
   a light-blocking film attached to at least one surface of the transparent substrate and having a circular opening; and
   a lens portion disposed on the at least one surface of the transparent substrate, the lens portion being composed of ultraviolet curable resin and having a lens-functioning surface, the lens portion being disposed such that the lens-functioning surface covers the opening and overlaps an area of the light-blocking film that surrounds the opening, wherein the lens portion includes a thin peripheral section outside the lens-functioning surface, and the light-blocking film is disposed between the thin peripheral section and the transparent substrate.

2. The optical element according to claim 1, wherein the lens portion has an outside diameter that is greater than or equal to about 1.95 times a diameter of the opening.

3. The optical element according to claim 1, further comprising a second lens portion on a surface of the transparent substrate that is opposite to the at least one surface having the lens portion thereon, the second lens portion being composed of ultraviolet curable resin and having a second lens-functioning surface, the second lens portion having an outside diameter that is greater than or equal to about 1.95 times a diameter of the opening.

4. The optical element according to claim 3, further comprising:
   a second transparent substrate disposed facing the transparent substrate with a spacer therebetween;
   a second light-blocking film attached to a surface of the second transparent substrate that faces the second lens portion, the second light-blocking film having a second circular opening; and
   a third lens portion disposed on the surface of the second transparent substrate facing the second lens portion, the third lens portion being composed of ultraviolet curable resin and having a third lens-functioning surface, the third lens portion being disposed such that the third lens-functioning surface covers the second opening and overlaps an area of the second light-blocking film that surrounds the second opening.

5. The optical element according to claim 4, wherein the third lens portion has an outside diameter that is greater than or equal to about 1.3 times a diameter of the second opening.

6. The optical element according to claim 4, further comprising a fourth lens portion on a surface of the second transparent substrate that is opposite to the surface having the third lens portion thereon, the fourth lens portion being composed of ultraviolet curable resin and having a fourth lens-functioning surface, the fourth lens portion having an outside diameter that is greater than or equal to about 1.45 times a diameter of the second opening.

7. The optical element according to claim 3, wherein the lens portion is composed of a low dispersion material, and the second lens portion is composed of a high dispersion material.

8. The optical element according to claim 4, wherein one of or each of the second lens portion and the third portion is composed of a high dispersion material, and the remaining lens portion or lens portions is/are composed of a low dispersion material.

* * * * *